(12) United States Patent
Sastri et al.

(10) Patent No.: US 10,005,679 B2
(45) Date of Patent: Jun. 26, 2018

(54) BLACK WATER PROCESSING SYSTEM WITH HIGH PRESSURE FLASH VESSEL

(71) Applicant: General Electric Company, Schenectady, NY (US)

(72) Inventors: Annavarapu Vijay Bharat Sastri, Karnataka (IN); Murugaraja Sengottaiyan, Kornataka (IN)

(73) Assignee: General Electric Company, Schenectady, NY (US)

( * ) Notice: Subject to any disclaimer, the term of this patent is extended or adjusted under 35 U.S.C. 154(b) by 815 days.

(21) Appl. No.: 14/526,743

(22) Filed: Oct. 29, 2014

(65) Prior Publication Data
US 2016/0122204 A1   May 5, 2016

(51) Int. Cl.
| | |
|---|---|
| C02F 1/06 | (2006.01) |
| B01D 3/06 | (2006.01) |
| B01D 5/00 | (2006.01) |
| C02F 103/36 | (2006.01) |

(52) U.S. Cl.
CPC ................ *C02F 1/06* (2013.01); *B01D 3/06* (2013.01); *B01D 3/065* (2013.01); *B01D 5/006* (2013.01); *B01D 5/0012* (2013.01); *B01D 5/0063* (2013.01); *C02F 2103/365* (2013.01); *C02F 2201/002* (2013.01)

(58) Field of Classification Search
CPC ........ B01D 3/06; B01D 5/0012; B01D 5/006; B01D 5/0063; C02F 1/06
See application file for complete search history.

(56) References Cited

U.S. PATENT DOCUMENTS

| | | | | |
|---|---|---|---|---|
| 3,853,672 | A | * 12/1974 | Gordon | B01D 1/00 159/17.3 |
| 6,036,748 | A | * 3/2000 | Wallace | B01D 3/06 95/257 |
| 8,181,693 | B2 | 5/2012 | Park et al. | |
| 8,424,340 | B2 | 4/2013 | Eaton et al. | |
| 2009/0120290 | A1 | 5/2009 | Wallace et al. | |
| 2011/0209407 | A1 | 9/2011 | Arya et al. | |
| 2012/0241388 | A1 | 9/2012 | Shah | |
| 2013/0045143 | A1 | 2/2013 | Steele et al. | |
| 2013/0183204 | A1 | 7/2013 | Benipal et al. | |
| 2014/0252276 | A1* | 9/2014 | Chandran | C01B 3/52 252/373 |

* cited by examiner

*Primary Examiner* — Renee Robinson
(74) *Attorney, Agent, or Firm* — Eversheds Sutherland (US) LLP

(57) ABSTRACT

The present application provides a black water processing system for cleaning a flow of black water. The black water processing system may include a flash vessel for producing a flow of overhead vapors from the flow of black water. The flash vessel also may include an integrated heat exchanger in communication with a flow of grey water. The flow of overhead vapors and the flow of grey water may exchange heat in the integrated heat exchanger.

14 Claims, 2 Drawing Sheets

BLACK WATER PROCESSING SYSTEM WITH HIGH PRESSURE FLASH VESSEL

TECHNICAL FIELD

The present application and the resultant patent relate generally to gasification systems and more particularly relate to a black water processing system with a high pressure flash vessel and an integrated grey water heat exchanger for reduced water usage.

BACKGROUND OF THE INVENTION

Fossil fuels such as coal, coke, petroleum, and the like may be gasified for use in the production of electricity, chemicals, synthetic fuels, or for a variety of other applications. Gasification involves reacting a carbonaceous fuel and oxygen at a very high temperatures to produce a syngas. Syngas is a fuel containing carbon monoxide and hydrogen. Syngas burns more efficiently and cleanly than the carbonaceous fuel in its original state. A byproduct of gasification is black water. Black water generally includes particles of ash, metals, ammonia, organic matter, and dissolved gases. One way to clean the black water is through a flash separation processes to separate the dissolved gases therein. A significant volume of demineralized grade water then may be used as wash water to remove the solids.

There is a desire for improved gasification processes and systems that may adequately clean black water and the like in a more efficient process. Moreover, such improved processes and systems may use less water and, hence, may provide reduced overall costs in a more environmentally friendly fashion as compared to some prior systems.

SUMMARY OF THE INVENTION

The present application and the resultant patent thus provide a black water processing system for cleaning a flow of black water. The black water processing system may include a flash vessel for producing a flow of overhead vapors from the flow of black water. The flash vessel also may include an integrated heat exchanger in communication with a flow of grey water. The flow of overhead vapors and the flow of grey water may exchange heat in the integrated heat exchanger.

The present application and the resultant patent further provide a method of cleaning a flow of black water. The method may include the steps of flashing the flow of black water to create a flow of overhead vapors in a flash vessel, flowing grey water through an integrated heat exchanger in the flash vessel, exchanging heat between the flow of overhead vapors and the flow of grey water, condensing the flow of overhead vapors into a condensed flow, and entraining black water solids therein within the condensed flow.

The present application and the resultant patent further provide a flash vessel for cleaning a flow of black water. The flash vessel may include a black water port, a black water discharge port, an overhead vapor port, and an integrated grey water heat exchanger. The grey water heat exchanger exchanges heat between a flow of overhead vapors and a flow of grey water.

These and other features and improvements of the present application and the resultant patent will become apparent to one of ordinary skill in the art upon review of the following detailed description when taken in conjunction with the several drawings and the appended claims.

DETAILED DESCRIPTION

Figure 1:
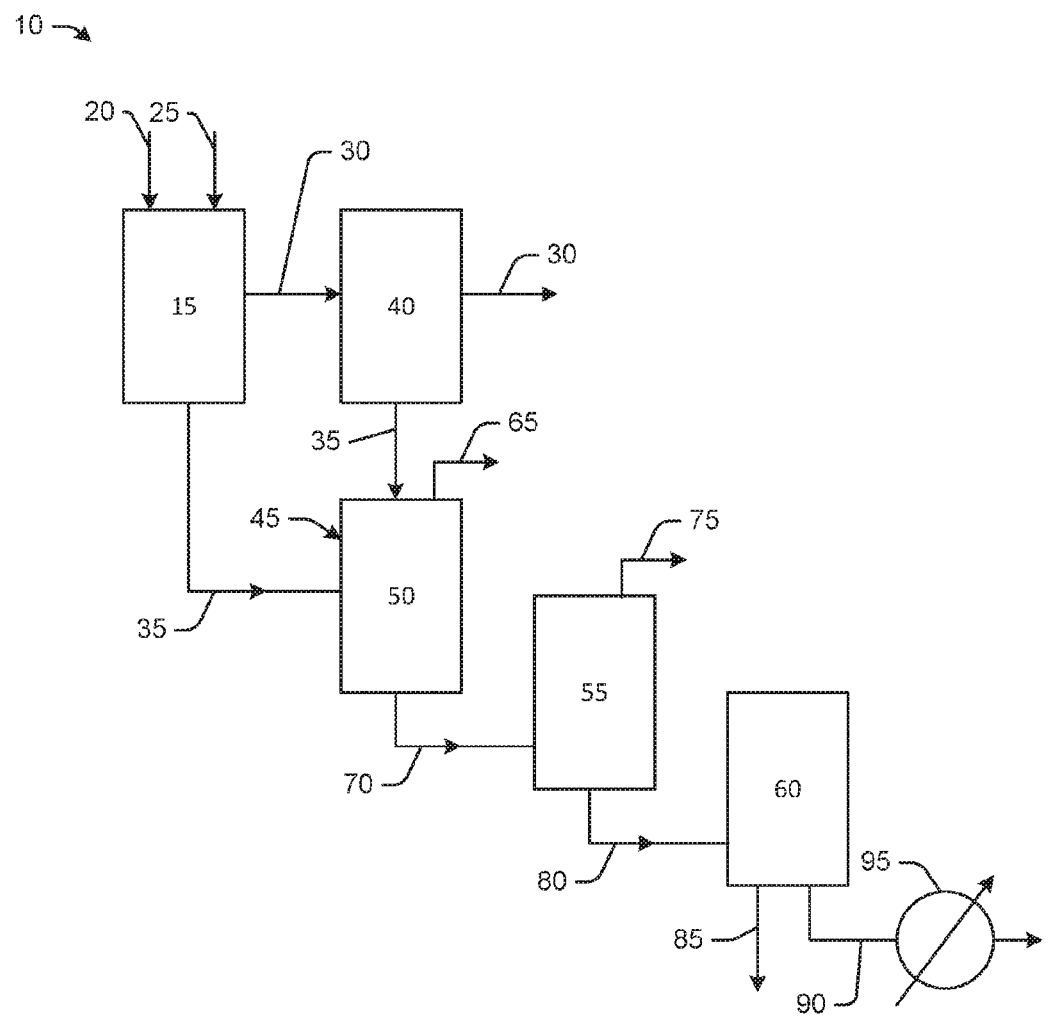
FIG. 1 is a schematic diagram of a portion of a known gasification system with black water recovery therein.

Referring now to the drawings, in which like numerals refer to like elements throughout the several views, FIG. 1 shows an example of a gasification system 10 that may be described herein. Generally described, the gasification system 10 includes a gasifier 15. The gasifier 15 may receive a fuel slurry 20 and a flow of oxygen 25. The gasifier 15 reacts with the fuel slurry 20 and the flow of oxygen 25 to produce a flow of a syngas 30. The reaction also creates a flow of black water 35. As described above, the flow of black water 35 may include fine particles of slag and other impurities therein. The flow of syngas 30 may be directed to a scrubber 40. Additional fines and other entrained gases may be removed therein. The scrubber 40 also may produce a further flow of the black water 35. The syngas 30 then may be further processed as appropriate.

The gasification system 10 also may include a black water processing system 45. The black water processing system 45 may include one or more flash vessels that subject the flow of black water 35 to a series of flash pressure reductions to remove dissolved gases and to concentrate the fine particles therein. In this example, the black water processing system 35 may include a high pressure flash vessel 50, a low pressure flash vessel 55, and a settler 60. Other types of black water processing systems and components may be known.

The high pressure flash vessel 50 may be configured to perform a first flash event on the flow of black water 35 to produce a first overhead vapor 65. A flow of first discharge black water 70 then may flow to the low pressure flash vessel 55. The low pressure flash vessel 55 performs a second flash event producing a second overhead vapor 75 and a second discharge black water flow 80. This second discharge black water flow 80 then may be sent to the settler 60 or elsewhere. The settler 60 separates the flow into concentrated fines 85 and a volume of grey water 90. The grey water 90 may be send for further processing or for other uses in the gasification system 10 or otherwise. A grey water heat exchanger 95 may be positioned downstream of the settler 60 to cool or warm the flow of grey water 90 as may be desired for other applications.

The gasification system 10 described herein is for the purpose of example only. Many other types of gasification systems may be known with different components and different configurations.

Figure 2:
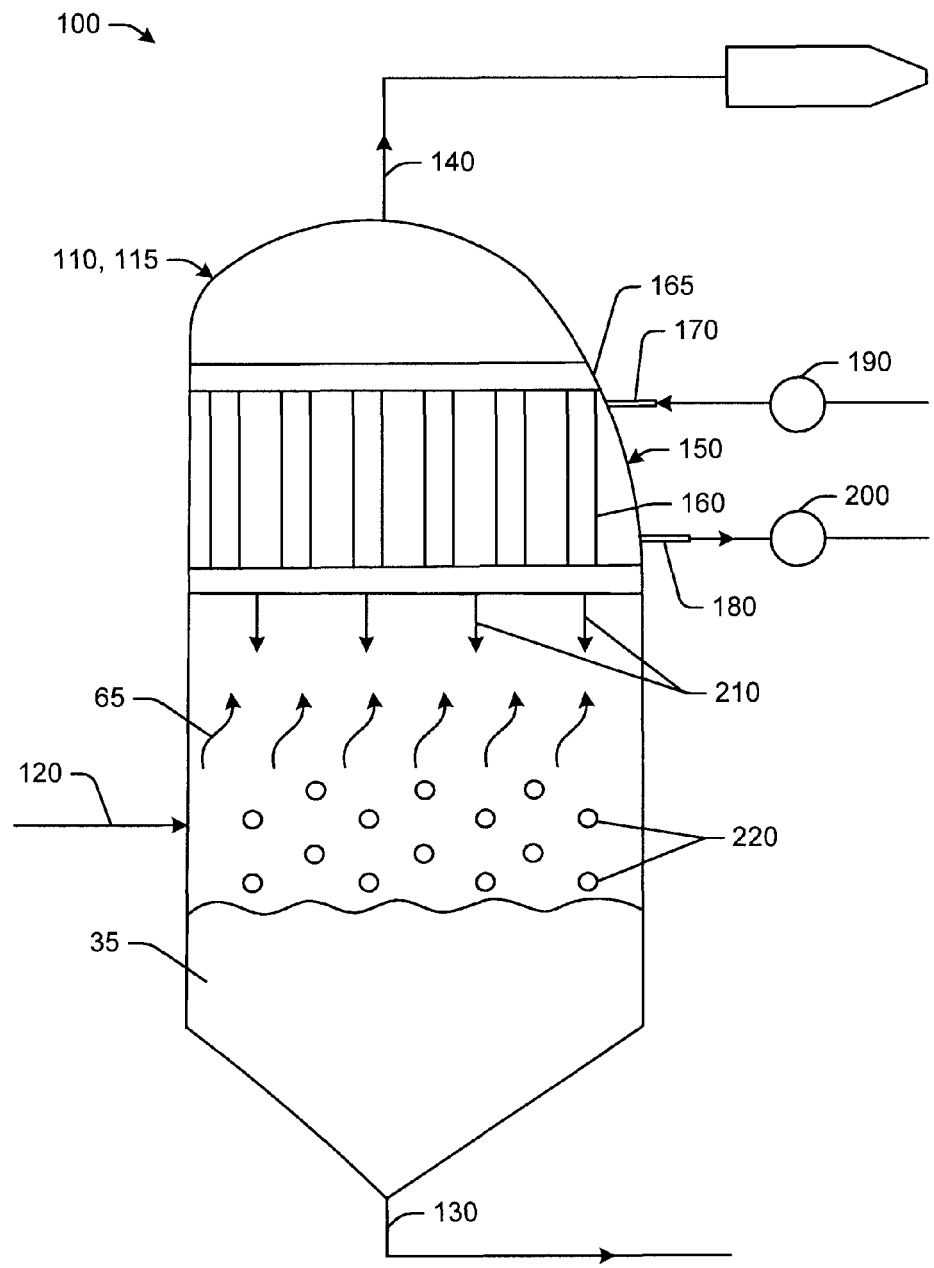
FIG. 2 is a schematic diagram of a portion of a black water recovery system with a high pressure flash vessel and an integrated grey water heat exchanger as may be descried herein.

FIG. 2 shows an example of a portion of a black water processing system 100 as may be described herein. The black water processing system may include a flash vessel 110. The flash vessel 110 may have any suitable size, shape, configuration, or capacity. The black water processing system 100 and the flash vessel 110 may be used with the gasification system 10 and similar types of systems. In this example, the flash vessel 110 may be a high pressure vessel 115. Other types of flash vessels may be used herein.

The flash vessel 110 may include a black water port 120. The black water port 1120 may be in communication with the flow of black water 35 from the gasifier 15 and/or the scrubber 40. The flash vessel 110 also may have a low pressure flash vessel port 130 at a bottom thereof. The low pressure flash vessel port 130 may be in communication with the low pressure flash vessel 55 or otherwise. The flash vessel 110 also may have an overhead vapor port 140. The overhead vapor port 140 may direct the flow of the first overhead vapors 65 for further heat integration in the process or elsewhere for treatment. Other components and other configurations also may be used herein.

The flash vessel 110 also may include an integrated grey water heat exchanger 150 therein. The integrated grey water heat exchanger 150 may be a conventional heat exchanger with a number of tubes 160 within a shell 165. The integrated grey water heat exchanger 150 may have a feed port 170 and a discharge port 180. The integrated grey water heat exchanger 150 may have any suitable size, shape, configuration, or capacity. The feed port 170 may be in communication with a scrubber feed pump 190 or elsewhere. The discharge port 180 may be in communication with a scrubber sump pump 200 associated with the scrubber 40 or elsewhere. Other types of water flows may be used herein. Other components and other configurations may be used herein.

In use, the flash vessel 110 with the integrated grey water heat exchanger 150 thus exchanges heat between the first overhead vapors 65 and the flow of grey water 90 circulating with the scrubber 40 or otherwise. Specifically, the first overhead vapors 65 may pass through the tubes 160 of the integrated grey water heat exchanger 150. Likewise, the flow of grey water 90 may enter the shell 165 of the integrated grey water heat exchanger 150 and exchange heat with the first overhead vapors 65. As the first overhead vapors 65 cool down and change to a liquid phase, any black water entrained solids 210 may be washed as a condensed liquid 220 back into the flash vessel 110 instead of downstream with the first overhead vapors 65.

By capturing the entrained solids 210 as this point, downstream carryover of the entrained solids 210 thus may be limited and/or avoided. As described above, demineralized grade water generally may be used as wash water to remove the entrained solids 210 in later processing. The integrated grey water heat exchanger 150 thus may save a significant volume of water. Moreover, given the reduction in overall wash water, the volume of the flash vessel 110 as a whole may be reduced. Other types of heating and cooling flows also may be used herein.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

We claim:

1. A black water processing system for cleaning a flow of black water, comprising:
    a flash vessel;
    the flash vessel producing a flow of overhead vapors from the flow of black water;
    the flash vessel comprising an integrated heat exchanger within the flash vessel; and
    a settler downstream of the flash vessel and comprising an outlet for a flow of grey water;
    wherein the grey water outlet is in fluid communication with the integrated heat exchanger such that the flow of overhead vapors and the flow of grey water exchange heat in the integrated heat exchanger.

2. The black water processing system of claim 1, wherein the flash vessel comprises a high pressure flash vessel.

3. The black water processing system of claim 1, wherein flash vessel comprises a black water port in communication with the flow of black water.

4. The black water processing system of claim 1, wherein the flash vessel comprises an overhead vapor port in communication with the flow of overhead vapors.

5. The black water processing system of claim 4, further comprising a scrubber in communication with the flow of overhead vapors.

6. The black water processing system of claim 1, wherein the flash vessel comprises a low pressure port in communication with a flow of a first discharge black water.

7. The black water processing system of claim 6, further comprising a low pressure flash vessel in communication with the flow of the first discharge black water.

8. The black water processing system of claim 1, wherein the integrated heat exchanger comprises a plurality of tubes in communication with the flow of overhead vapors.

9. The black water processing system of claim 8, wherein the integrated heat exchanger comprises a shell in communication with the flow of grey water.

10. The black water processing system of claim 1, wherein the integrated heat exchanger comprises a feed port in communication with the flow of grey water.

11. The black water processing system of claim 10, wherein the feed port is in communication with a scrubber feed pump.

12. The black water processing system of claim 1, wherein the integrated heat exchanger comprises a discharge port in communication with the flow of grey water.

13. The black water processing system of claim 12, wherein the discharge port is in communication with a scrubber sump pump.

14. A method of cleaning a flow of black water, comprising:
    flashing the flow of black water to create a flow of overhead vapors in a flash vessel and a flow of discharge black water;
    flowing the discharge black water through a settler to separate concentrated fines from a flow of grey water;
    flowing the grey water through an integrated heat exchanger within the flash vessel;
    exchanging heat between the flow of overhead vapors and the flow of grey water;
    condensing the flow of overhead vapors into a condensed flow; and
    entraining black water solids within the condensed flow.

* * * * *